Dec. 15, 1970  R. M. CENTNER ET AL  3,548,172
ADAPTIVE CONTROL SYSTEM FOR NUMERICALLY
CONTROLLED MACHINE TOOL
Filed Aug. 24, 1964  5 Sheets-Sheet 1

INVENTORS.
RONALD M. CENTNER.
JEROME M. IDELSOHN.

BY

ATTORNEY

INVENTORS
RONALD M. CENTNER.
JEROME M. IDELSOHN.

BY *Allen M. Krass*

ATTORNEY

INVENTORS
RONALD M. CENTNER.
JEROME M. IDELSOHN.

BY *Allen M. Krass*

ATTORNEY

FIG. 9

United States Patent Office 3,548,172
Patented Dec. 15, 1970

3,548,172
ADAPTIVE CONTROL SYSTEM FOR NUMERICAL-
LY CONTROLLED MACHINE TOOL
Ronald M. Centner, Southfield, and Jerome M. Idelsohn,
Huntington Woods, Mich., assignors to The Bendix
Corporation, Detroit, Mich., a corporation of Delaware
Filed Aug. 24, 1964, Ser. No. 391,549
Int. Cl. G05b 13/02; G06f 15/46
U.S. Cl. 235—151.11               8 Claims

ABSTRACT OF THE DISCLOSURE

The path through which the cutter of a milling machine moves, and its speed of rotation, are controlled at a primary level by numerical information encoded on a punched tape. A contouring type numerical control unit accepts the numerical information and generates signals which control the position and rotational speed of the cutter. These signals are modified by an adaptive controller on the basis of transducer signals which are functions of conditions at the tool-workpiece interface, such as temperature, vibration, and torque. The adaptive controller includes a data reduction sub-system which accepts these transducer signals and various other data which is received from the numerical control unit or introduced from outside the system, and calculates basic factors relating to the performance of the milling machine system, such as tool wear rate and metal removal rate. These signals are introduced to a performance computer system which also receives external data and continuously generates a figure of merit for the operation of this milling machine. An optimization computer periodically samples this figure of merit and generates output signals which are a function of the change of the figure of merit between successive samplings, which are in turn used to modify the output signals of the numerical control unit. The system operation is such that the machine operation is continually modified to seek a maximum figure of merit.

---

This invention relates to systems for controlling the operation of machine tools in accordance with numerical data and more particularly to such systems which modify the control of the machine operation as a function of the machining variables such as tool-tip temperature and spindle torque.

BACKGROUND OF THE INVENTION

Systems for controlling the motion of output members of machine tools in accordance with numerical data have greatly improved the production rate and quality of the parts formed by these machines. Most commonly applied to milling machines these contouring control systems employ feedback control loops which measure and control the relative position and relative velocity of the workpiece and the cutting tool. The particular values of position and velocity to which the machine is controlled are determined by a part programmer who may readily determine the necessary sequence of positions of the cutter from the geometric requirements of the finished part. However, the part programmer's selection of velocity commands such as cutter speed and feed rate is largely empirically based upon a combination of experience and handbook data. These velocity commands directly affect the production rate and machining costs, and have a significant effect on quality aspects such as surface finish and dimensional accuracy.

The use of empirical techniques to select speed and feed values cannot be expected to yield optimum performance. The reasons for this include variations in workpiece metallurgy, variations in cutter sharpness, unpredictable chatter effects on surface finish, and variation between handbook data obtained under controlled laboratory environment and actual performance obtained in production environment. The use of analytical techniques to predict optimum or near-optimum speed or feed values would be a formidable if not impossible task.

It is, therefore, a primary object of the present invention to provide a numerically controlled system for a machine tool which optimizes cutter speed and feed rate by means of measuring performance variables related to the cutting operations such as tool-tip temperature and spindle torque and then adapts the operation of a machine in accordance with this data in such a way as to optimize machine performance.

Broadly, control systems formed in accordance with this invention employ sensors which measure the machining variables during the actual cutting operation. The sensor outputs are applied to an adaptive controller, which calculates the overall system performance and then adjusts the feed and/or speed and recalculates performance on the basis of the changed sensed variables. If the first adjustments resulted in improved performance, new adjustments are made in the same direction. This process is continual and thus the system seeks and maintains an optimum performance.

CROSS-REFERENCE TO RELATED PATENTS

The numerical control system to which the present invention is applied may be of the type disclosed in U.S. Pats. 3,002,115 or 3,128,374, both of which are owned by the assignee of the present invention. These systems are used to control the position and velocity of a milling machine cutter with respect to a workpiece in accordance with numerical data normally provided on a punched tape.

BRIEF SUMMARY OF THE INVENTION

In the preferred embodiment of the present invention, which will subsequently be disclosed in detail, the input data will include dimensional coordinates of desired motions, and information relating to the spindle rotational speed and feed motion of the spindle with respect to the workpiece. The system employs a tape reader to convert this numerical data on the information tape or record into electrical representations which are then employed to generate command signals for servo-mechanisms. The machine is normally adapted to move the cutter with respect to the workpiece along a plurality of axes simultaneously and one servo-mechanism is employed for each axis to convert command signals into output motion. In the preferred embodiment the commands to the servo-mechanisms will constitute trains of pulses and the servo-mechanisms are adapted to move the machine component through distances proportional to the number of pulses contained in a train at a rate proportional to the pulse frequency. In such machines the servo drives move the output members along the machine axes so as to generate the desired contour at the programmed rate, with the spindle rotating at the programmed speed. Feedback transducers sense the actual motion and compare them with the command signals to assure accurate execution of the commands. However, the actual process output, which is in reality the condition and shape of the finished part, is removed from the feedback point by the effects of the tool-work interface. Since these effects are complex and difficult to predict, the process output will not conform precisely to that desired by the programmer. To achieve good control of the finished part it is often necessary to program the feed and speed conservatively low.

In the preferred embodiments adaptive control is applied to the system by using additional feedback information obtained from the process output through the use of transducers or by means of sensors coupled as closely as possible to the tool-workpiece interface. The sensor signals, which may represent such variables as torque vibration, and temperature, are applied to an adaptive controller containing three major parts: a data reduction subsystem, a performance computer, and an optimization computer.

The data reduction subsystem accepts the sensor outputs, feed and speed information from the numerical control system plus a group of constants which relate to the machining operation and may be entered into the system by tape or by manually actuated switches or potentiometer settings. Some of the constants relate to tool wear and are dependent upon the nature of the workpiece and tool material and upon the type of cut. Another of the constants relates to the width and depth of the cut being made. The other constants are known as "constraint limits" and they correspond to maximum or minimum values of the measured and controlled variables, including torque, feed, speed, tool temperature and vibration. The output of the data reduction subsystem constitutes two analog signals which are proportional to the tool wear rate and the metal removal rate. Additionally, the data reduction subsystem generates constraint violation signals when the constraint limits are exceeded as well as a signal indicating whether cutting is in progress.

The two analog signals proportional to tool wear rate and metal removal rate are fed to the performance computer. This computer also receives analog signals proportional to constants which relate to the performance criteria and cost of operation of the system and are entered manually or from the information tape. The performance computer acts in an analog manner to develop a figure of merit for the entire machining operation. This figure of merit is provided as an analog output by the performance computer and it may be based upon various criteria such as production rate or machining cost or some combination of the two.

The optimization computer receives the figure of merit information from the performance computer and operates in a digital manner to adjust the feed and speed values provided by the information tape so as to maximize the figure of merit. The computer operates on a sample-data basis, i.e. the value of the figure of merit is sampled periodically and a feed and/or speed adjustment is made after each sampling. Whether the figure of merit increased or decreased after a change in a quantity determines the direction of the next change and the magnitude of the variation in the figure of merit controls the magnitude of the change.

The constraint violation signals are sent directly from the data reduction subsystem to the optimization computer. The occurrence of a violation at any time interrupts the normal optimization logic and initiates a special subroutine which operates to change the feed and speed so as to return to an acceptable performance condition. After the constraint violation has been removed, the system returns to normal operation. Certain other operational conditions, such as slewing and deceleration, may also require interruption or modification of the normal optimization cycle. These conditions are provided to the optimization computer by special interrupt signals from the numerical control unit and a "cutting not in progress" signal from the data reduction subsystem.

The system also requires a unit, which may be considered part of the optimization computer, to connect the optimization computer to the numerical control unit. This unit, termed the numerical control system interface, acts to modify the feed and speed information and the motion commands produced by the numerical control unit in accordance with the correction signals from the optimization computer.

It is, therefore, seen that a primary object of the present invention is to provide a numerical control system for machine tools wherein the programmed machine control values are modified in accordance with the actual machine tool performance in order to optimize the machine tool operation.

Another object is to provide such a system wherein the machine variables are sensed and are employed to modify factors affecting tool cutting speed, including tool rotation rate and tool feed in order to optimize the entire operation in accordance with externally-supplied criteria.

A still further object is to provide a system of this type wherein the machining variables are sensed and are employed to calculate a figure of merit for the entire operation and the operation of the numerical control system is modified in order to optimize this figure of merit.

Another object is to provide such a system wherein changes are periodically made in the programmed data and the effect of these changes on the figure of merit is observed so as to control the direction of subsequent changes so that the system operation is continually modified to seek an optimum performance.

Other objects, advantages, and applications of the present invention will be made apparent from the following detailed description of a preferred embodiment of the invention. The description makes reference to the accompanying drawings in which:

DETAILED DESCRIPTION OF THE PREFERRED EMBODIMENT

Figure 1:
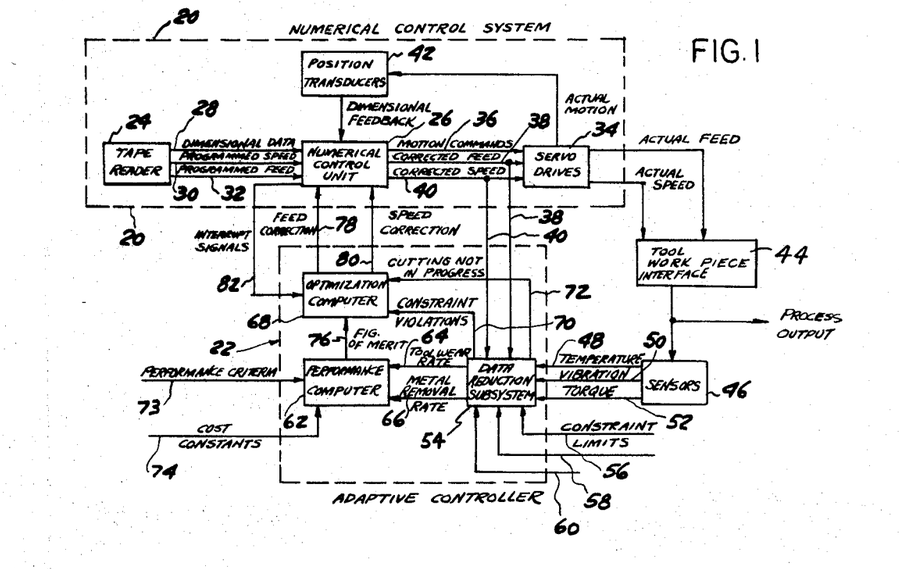
FIG. 1 is a block diagram of a preferred embodiment of the invention wherein the operation of a numerical control system is monitored and modified by an adaptive control.

Referring to FIG. 1 the preferred embodiment of the invention employs a numerical control system, generally indicated at 20, which may be of the type disclosed in the previously noted patents. The invention differs from the previous systems by providing an adaptive controller generally indicated at 22 which senses the variables of the machining operation and modifies the operation of the numerical control system in such a manner as to optimize the machining performance.

Considering the numerical control system 20 in detail, it employs a tape reader 24 to decode the markings on an input medium such as a punched tape, also referred to herein as a record, and to generate electrical representations of the programmed data. In the preferred embodiment of the invention this data will include dimensional information which relates to the geometry of the desired part, speed data which relates to the desired rate of rotation of the machine tool spindle and feed information which relates to the motion of the tool with respect to the workpiece along its programmed path. In the present embodiment the feed information will be in units of inches of relative machine slide travel per spindle revolution. The term "feedrate" will also be employed and will denote inches of slide travel per minute. Conversion from one form to the other is easily accomplished since feedrate=feed×spindle speed. The dimensional data, feed and speed data are respectively applied to a numerical control unit 26 from the tape reader 24 on lines 28, 30 and 32.

The numerical control unit 26 receives the data from the tape reader 24 and is adapted to generate motion commands for energizing the servo drives contained in unit 34. In the aforementioned patents, these motion commands take the form of pulse trains which incorporate both distance commands and feed rate commands. However, for purposes of illustration these motion commands and the feed commands are shown as applied to the servo drive unit 34 on separate lines 36 and 38. The feed command provided on line 38 is denoted as corrected feed as it is one of the two quantities which is varied from the programmed value by the adaptive controller 22. The numerical controller 26 also supplies a corrected feed signal to the servodrives on line 40. The speed signal controls the rate of rotation of the milling machine spindle. The positional output of the servo drives is detected by transducers 42 and applied to the numerical control unit 26 in order to maintain the positions at the programmed points. The servo drives 34 control the actual feed and speed of the cutting tool with respect to the workpiece at the tool-workpiece interface 44. A plurality of sensors or transducers 46 are located adjacent to this interface within as close proximity to the actual cutting operation as is physically possible and they measure various parameters of the cutting operation. In the preferred embodiment, these parameters are the average tip temperature and vibration of the cutting tool, and the torque exerted on the cutting tool. The electrical outputs of the sensors 46 denoting these quantities are applied on lines 48, 50 and 52 respectively to the data reduction subsystem 54, which forms part of the adaptive controller 22.

In the preferred embodiment of the invention the outputs of these sensors 46 constitute voltages having amplitudes proportional to the variables being sensed. The torque and temperature signals are provided as D.C. voltages, and the vibration as an A.C. voltage.

The data reduction subsystem also has as inputs the lines 38 and 40 from the numerical control unit 26 which respectively provide the feedrate and the spindle speed as corrected by the adaptive controller. A plurality of analog values representing maximum and/or minimum values of the spindle speed, feed, torque, vibration, and temperature, are introduced to the data reduction subsystem on a channel represented by line 56. The data reduction subsystem also receives constants relating to the cutting operation including an analog factor proportional to the width and the depth of the cut on line 58 and constants relating to the tool wear on line 60. These constants may be entered into the system by manual devices such as potentiometers or derived from information coded on the tape. In the preferred embodiment potentiometer settings are employed to provide these constants to the system.

The primary function of the data reduction subsystem is to operate upon this information in an analog manner and provide a pair of analog signals to the performance computer 62. These analog signals are the tool wear rate which is transmitted on line 64 and the metal removal rate transmitted on line 66. These two quantities are functions of the input data to the data reduction subsystem 54.

The data reduction subsystem 54 also supplies an optimization computer 68 with a set of signals on a channel 70 which indicates when any of the constraint limits received by the data reduction subsystem on line 56 have been violated. As will be subsequently described such a constraint violation causes the optimization computer to go into a special routine adapted to correct the violation. The data reduction subsystem 54 also provides a signal to the optimization computer 68 on line 72 indicating that cutting is not in progress.

The performance computer has as its other inputs a pair of channels 73 and 74 which carry analog values proportional to various performance criteria and cost constants. In the preferred embodiment this information is provided as potentiometer settings. These signals are employed as factors in the equation which the performance computer 62 solves in a hybrid digital analog manner in order to produce a figure of merit for the cutting operation. Thereby, the overall operation of the machine is evaluated either in terms of the cutting rate in cubic inches per minute or the cost of the operation in cubic inches per dollar or in some combination of the two depending upon the nature of the potentiometer settings. The effect of anticipated tool failure may be included in this evaluation.

The figure of merit calculated by the performance computer is transmitted to the optimization computer 68 on line 76. The figure of merit is represented as a pulse train having a frequency proportional to the encoded value. The optimization computer 68 operates on a digital basis. It first makes an exploratory incremental change in either feed or speed, and waits for the system to settle down to determine whether the change caused an increase or a decrase in the figure of merit of the operation. It then makes an experimental change in the other quantity (if feed has previously been changed, speed is now changed). After again waiting for the system to settle down it determines whether this change caused an increase or a decrease in the figure of merit of the system. It then changes both feed and speed simultaneously in directions determined by whether the exploratory changes produced increases or decreases in the figure of merit and by amounts proportional to the changes in the figure of merit which occurred as results of the individual exploratory moves. This sequence is continually repeated in order to optimize the operation of the system and to follow changes in the optimum which occur as a result of variations in the metalcutting conditions as may be caused by the programmed data, tool wear, or variations in workpiece characteristics.

In the event of occurrence of a constraint violation signal to the optimization computer on line 70, the computer goes into a special subroutine designed to correct that violation. The operation of the optimization computer may also be modified by interrupt signals transmitted from the numerical control unit on line 82. The feed and speed corrections transmitted by the optimization computer to the numerical control unit on lines 78 and 80 are added to or substracted from the programmed values previously retained in the numerical control unit. Depending upon the specific nature of the numerical control system various hardware may be needed to implement this addition or subtraction. The apparatus used to make this change will be disclosed in detail in FIG. 9.

While the broad operation of the system may be understood from the foregoing description a more detailed description will now be provided of the units which constitute the adaptive control 22.

DATA REDUCTION SUBSYSTEM

The metal removal rate is given by the equation $$MRR = Fwd$$

where:

$F$ = feedrate—(in./min.),
$w$ = width of cut—(in.),
$d$ = depth of cut—(in.).

Figure 2:
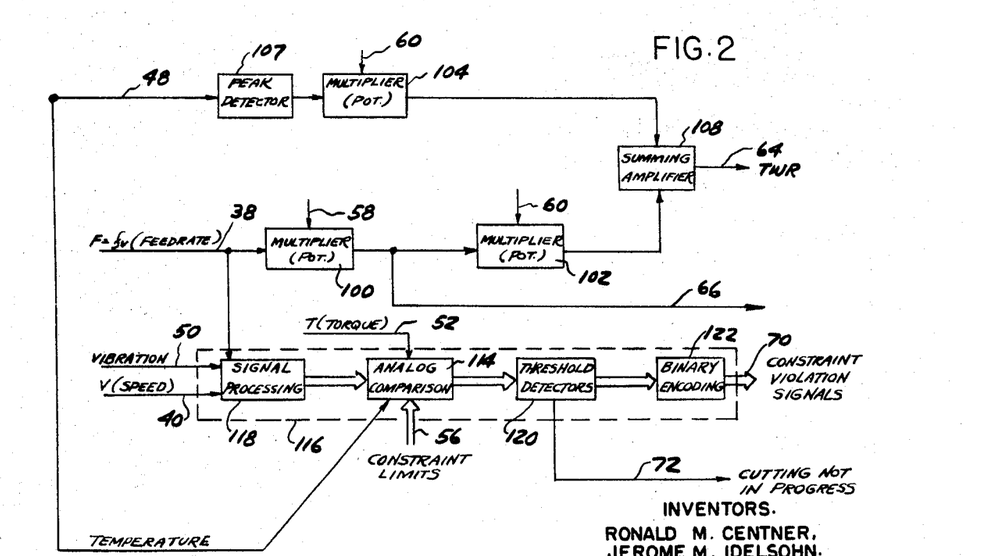
FIG. 2 is a block diagram of the data reduction subsystem employed with the preferred embodiment.

As shown in FIG. 2a, voltage proportional to F is available to the data reduction system on line 38. As has been noted, an input proportional to the width and depth of the cut is entered into the system as a potentiometer setting in the preferred embodiment. This setting 58 is applied to a multiplier potentiometer 100 which has the voltage on line 38 applied across it. The output across the variable arm of the potentiometer 100 is provided to the performance computer 62 on line 66.

The tool wear rate is calculated in accordance with the following equation: $TWR_c = K_5 MRR + K_6 \theta_p$ where:

$TWR_c$=calculated tool wear rate—(in.$^3$/min.), (line 64)
$K_5$, $K_6$=weighting factors, (channel 60)
$\theta_p$=amplified value of peak thermocouple voltage—(volts), (line 48)

The weighting factors are related to the particular characteristics of the tool, workpiece and machine and are entered into the system by setting calibrated potentiometers 102 and 104. In practice the operator or programmer would select these values based upon monographs or handbook data. The tool-tip temperature signal introduced on line 48 is provided to a peak detector 107 which derives the quantity $\theta_p$. This voltage is applied to the potentiometer 104 which has $K_6$ as its setting to produce a quantity $K_6\theta_p$ which is provided to a summing amplifier 108.

The quantity MRR developed by the multiplier potentiometer 100 is multiplied by the factor $K_5$ by the potentiometer 102 and this output is also provided to the summing amplifier 108. The output of the summing amplifier represents the tool wear rate and it is provided to the performance computer 62 on line 64.

Figure 3:
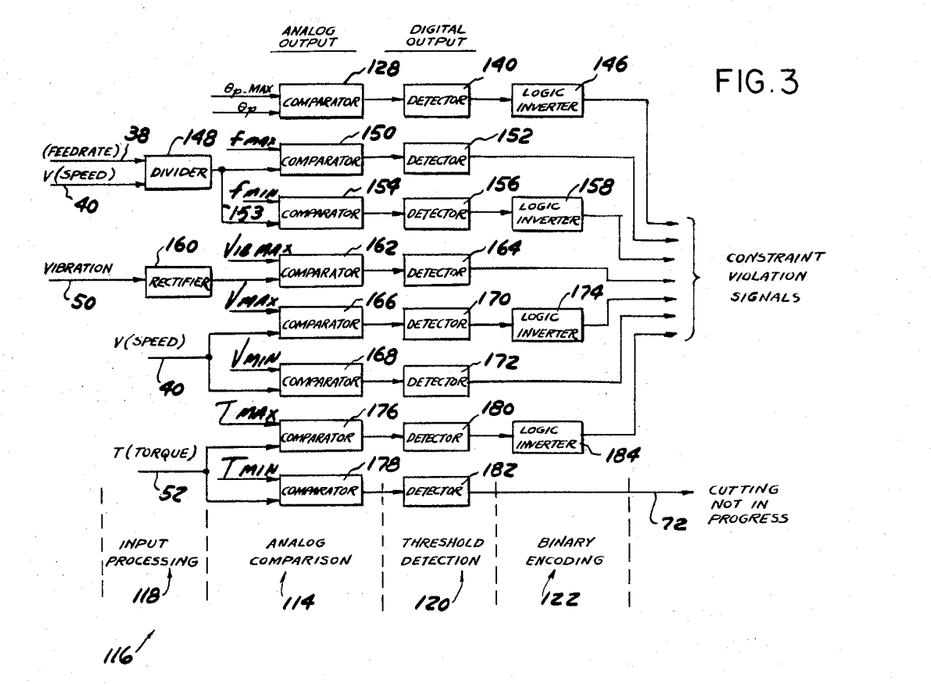
FIG. 3 is a block diagram of the constraint violation detectors which form part of the data reduction subsystem.

The constraint limits from channel 56 are introduced to an analog comparison unit 114 which forms part of a violation detector generally disclosed in 116 and illustrated in more detail at FIG. 3. The detector 116, as seen in FIG. 2, broadly constitutes a signal processing unit 118, analog comparison unit 114, threshold detectors 120 and a binary encoding unit 122.

Figure 4:
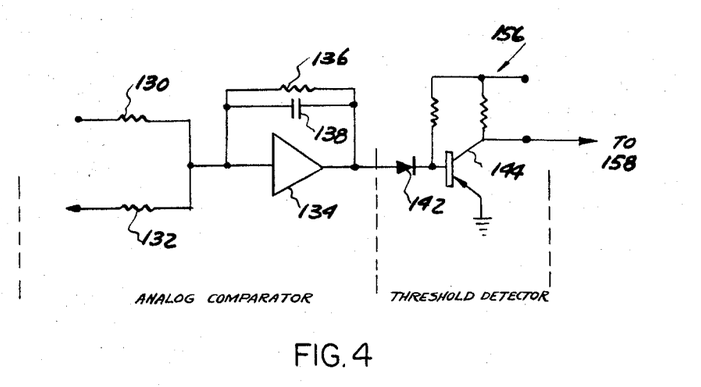
FIG. 4 is an electrical schematic diagram of a comparator and detector.

In the unit 118 the input signals are processed to put them into suitable form for comparison in unit 114. The outputs of the unit 114 are converted into digital signals and certain of the outputs of these signals are inverted to put them into proper form for use by the subsequent circuitry of the binary encoding section 122. Referring to FIG. 3 one of the units of the input processing section 118 is a divider 148. The inputs to the divider are the feedrate signal 38 and the speed signal 40. The divider may use any well-known computing technique to produce an output which is equal to the feedrate divided by the speed, or the actual feed per revolution. This is provided on line 153 to a comparator 154 which has the minimum feed indication as its other input. The comparator 154 is of the type illustrated in FIG. 4. The actual feed signal is provided to the comparator as a negative D.C. voltage and the minimum feed limit is provided as a positive D.C. voltage. In the circuit of FIG. 4 these two voltages are applied to the pair of resistors 130 and 132 which provide input to an operational amplifier 134. The amplifier is shunted by a resistor 136 and a capacitor 138. Its output is applied to a detector circuit 156 which constitutes a diode 142 connected to the base of a transistor 144 in a grounded emitter circuit. If the actual feed is greater than the minimum feed, the output voltage at the transistor collector will be a large negative value. If the actual feed is less than the minimum feed (a violation condition), the voltage condition will be near zero. In the adaptive controller circuitry a negative voltage is interpreted as a logical "1" and zero voltage is in the logic "0." Accordingly, it is necessary to logically invert the output of the detector to provide an appropriate signal for the optimization computer. This is done in the unit 158.

In FIG. 3, the actual peak temperature signal is provided to a comparator 128 which has the maximum temperature constraint limitation signal as its other input. The output of the comparator 128 is detected by the unit 140 and provided as one of the constraint violation signals after logic inversion by unit 146. The actual feed output of the divider 148 is also provided to another comparator 150 which has the maximum feed constraint limitation signal as its other input. The output of this circuit is detected in unit 152 and is provided as one of the constraint violation signals without inversion.

The A.C. vibration signal on line 50 is first rectified and peak detected in the unit 160 and then compared with the maximum vibration signal in comparator 162. The output is detected in unit 164 and may be used as a constraint violation signal directly.

The speed signal on line 40 is also provided to two comparators 166 and 168 which have the maximum and minimum speed constraints as their other inputs. Their outputs are applied to detectors 170 and 172 and the output of the detector 170 is inverted by the unit 174. The outputs of the inverter 174 and the detector 172 provide the necessary constraint violation signals. Similarly, the torque signal on line 52 is provided to two comparators 176 and 178, their ouputs are provided to detectors 180 and 182 and the output of the detector 180 is inverted by the unit 184. The output of the inverter 184 provides a constraint violation signal while the output of the detector 182 is provided on line 72 to the optimization computer and indicates that cutting is not in progress.

PERFORMANCE COMPUTER

Figure 5:
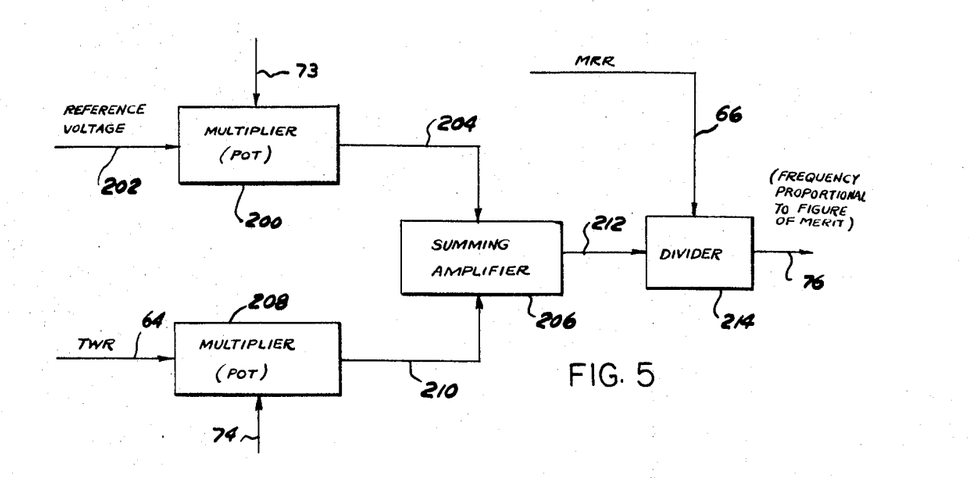
FIG. 5 is a block diagram of the performance computer which calculates the figure of merit of the operation.

As shown in FIG. 5, the performance computer operates upon the tool wear rate signal provided on line 64 and the metal removal rate signal provided on line 66 to generate a figure of merit for the system performance. The figure of merit is defined by the equation:

$$H = \left| \frac{MRR}{K_1 + \frac{(K_1 t_0 + K_2 B)}{W_0}(TWR_C)} \right| \quad 0 \leq B \leq 1$$

where:

H=figure of merit—(in.$^3$/$),
MRR=metal removal rate—(in.$^3$/min.), (line 66)
$TWR_c$=calculated tool wear rate—(in./min.), (line 64)
$K_1$=direct labor rate plus overhead rate—($/min.),
$K_2$=cost per grind plus initial tool cost/maximum number of regrinds—($),
$t_0$=downtime required to change tools—(min.),
$W_0$=maximum allowable wear land before regrinding—(in.).

The quantity E, which is denoted as the base of the figure of merit, is used to set the performance criteria. If B is set equal to one, the criteria is machining cost and the units of H are cubic inches per dollar. If B is set equal to zero, the criteria is production rate and the figure of merit expression reduces to:

$$H = \left[\frac{1}{K_1}\right] \left| \frac{MRR}{1 + \frac{t_0}{W_0}(TWR_C)} \right|$$

in which case H is a measure of cubic inches per minute. Intermediate values of B would result in a performance criteria which is a compromise between cost and production rate.

The quantity $K_1$ is available as a potentiometer setting on channel 73. This setting is applied to potentiometer 200 which has an arbitrary reference voltage on line 202 imposed across it. The voltage across its variable contact is applied on line 204 to a summing amplifier 206. The amplifier 206 also receives the output of a multiplier potentiometer 208 applied on the line 210. The potentiometer 208 has a voltage on line 64, which is proportional to calculated tool wear rate, across it. Its setting represents the function $(K_1t_0+K_2B)/W_0$ as is available on channel 74, representing various cost constants. The voltage output of the summing amplifier 206 is applied on line 212 to a divider 214. The divider is of the type which provides an output pulse train having a frequency directly proportional to one input voltage and inversely proportional to the other and thus divides the quantities. The numerator is provided on line 66 and represents the metal removal rate. The denominator is applied on line 212 and represents the denominator of the equation for the figure of merit. The output of the divider 214 is provided on line 76 and constitutes a pulse train having a frequency proportional to the figure of merit.

OPTIMIZATION COMPUTER

Figure 6:
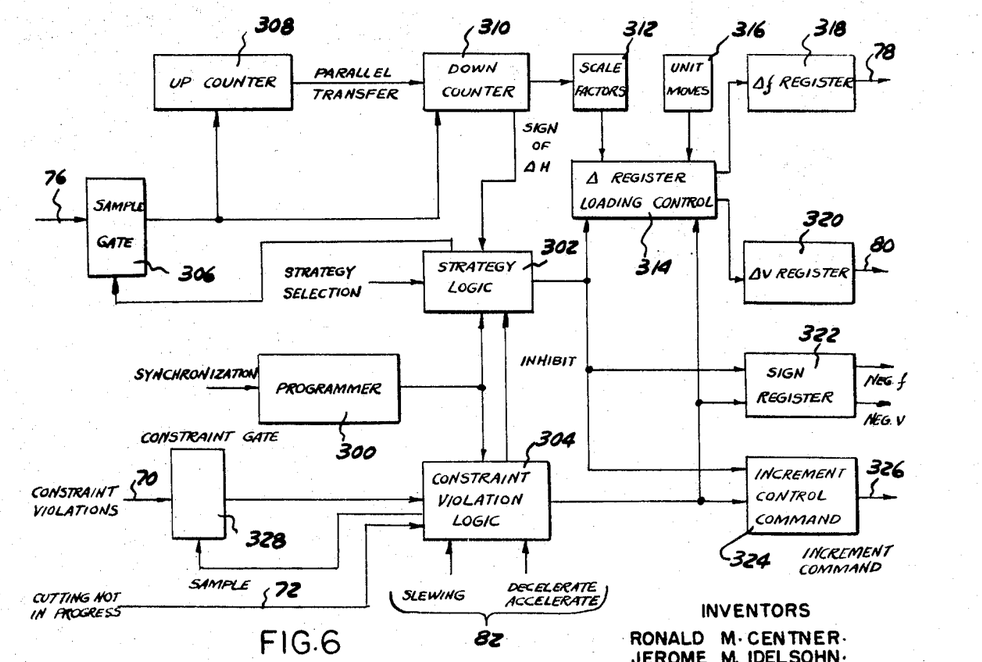
FIG. 6 is a block diagram of the optimization computer which receives the figure of merit and modifies the operation of the numerical control system in such a manner as to achieve an optimum performance.

The primary function of the optimization computer is the execution of the optimizing strategy. A secondary function is to correct any constraint violations that may occur. As shown in FIG. 6, the optimization computer receives the seven binary coded constraint violation signals from the data reduction subsystem on channel 70, and a pulse train of frequency proportional to the figure of merit H from the performance computer on line 76. The outputs are binary representations of a feed correction increment, $\Delta f$ on line 78, and a speed correction increment, $\Delta V$ on line 80. The entire operation is digital in nature.

The optimization computer could take the form of a properly programmed general purpose computer. At one stage in the development of the prototype of the preferred embodiment of this invention an IBM-650, computer was so programmed and interconnected with the other components of the adaptive control and the machine controller to perform the function of the optimization computer. However, the preferred embodiment of the invention employs a special purpose computer to perform the optimization function.

The broad technique of the optimization computer is to make a small exploratory change in the control system feed, $f$, in an arbitrary direction and then note the change which occurs in the figure of merit, H, after an appropriate settling time. Both the direction and magnitude of the change are noted. The computer then makes a similar small exploratory change in the control system spindle speed, V, while holding $f$ constant and again notes the sign and magnitude of change in H. These small changes provide the computer with information as to the approximate slope and direction of the gradient of the figure of merit in the operation region. The computer then makes what is termed a "gradient move" wherein it modifies both $f$ and V simultaneously. The direction of the increments to $f$ and V are determined by the response to the previous exploratory moves. If an exploratory move produced an increase in the figure of merit the gradient move is made in the same direction; however, if the exploratory move decreased the figure of merit the gradient move is made in the opposite direction. During the gradient movement both $f$ and V are incremented by amounts proportional to the changes in the figure of merit which resulted from their respective exploratory moves. Thus the gradient move is in the direction which produces the largest increase in H at that point.

Figure 7:
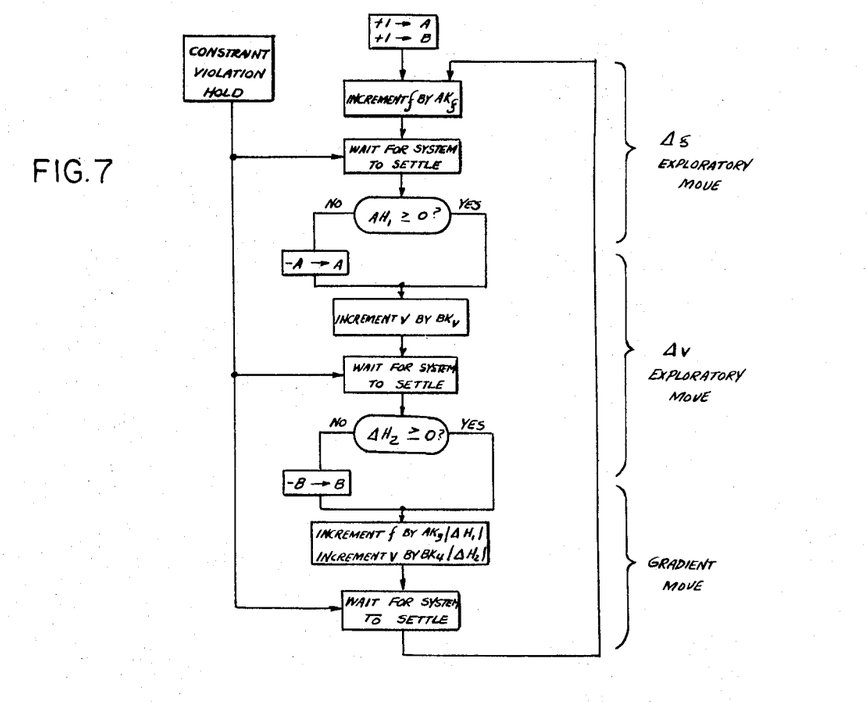
FIG. 7 is a sequence diagram illustrating the manner of operation of the optimization computer.

Execution of this steepest ascent strategy is accomplished by straight-forward digital techniques. The logical sequence diagram of the procedure is illustrated in FIG. 7. The signs A and B are initially arbitrarily selected to be in a positive direction. As a first step $f$ is incremented by a quantity $AKf$ where $Kf$ is a manually set constant which controls the size of the exploratory move. After waiting an appropriate time for the system to settle the computer notes $\Delta H_1$ which is the response of the figure of merit to this exploratory move in feed. If $\Delta H_1$ is negative, the sign A is changed to negative. Next the computer makes a similar exploratory move in V in an arbitrarily selected direction. Again, after waiting for the system to settle, the change in the figure of merit, $\Delta H_2$, is noted and the sign B is reversed if $\Delta H_2$ is less than zero. Finally, in the gradient move $f$ is incremented by a quantity $AK|\Delta H_1|$ and V is incremented by $BK_4|\Delta H_2|$, where $K_3$ and $K_4$ are constants which control the scale factors of the gradient move, the signs A and B are determined as previously noted, and the absolute values $|\Delta H_1|$ and $|\Delta H_2|$ are used to control the magnitude of the change. After the system is allowed to settle it begins the sequence anew. At any time during the sequence a constraint violation signal will interrupt this sequence in a manner to be described.

Figure 8:
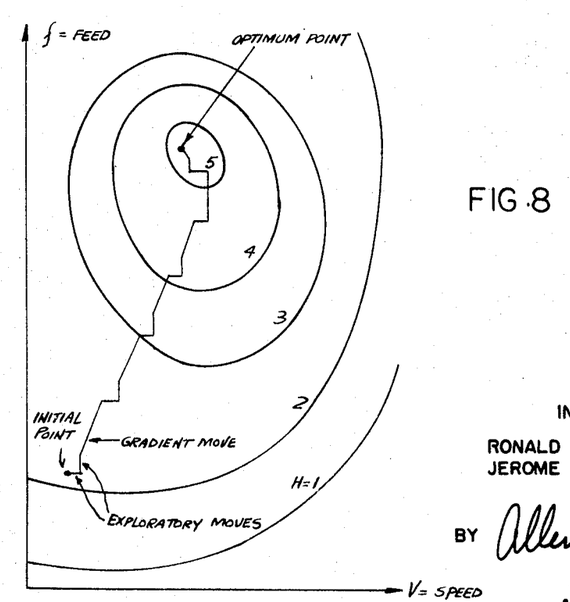
FIG. 8 is a plot of the system feed versus the system speed illustrating the lines of constant figure of merit for a typical program and the path of the optimization computer in arriving at the optimum feed/speed relationship for that typical program.

FIG. 8 illustrates a typical strategy of steepest ascent for a hypothetical feed-speed plot. It should be noted that each major (gradient) movement of the operating point is preceded by two smaller (exploratory) movements along the $f$ and V axes. It may also be noted that the gradient move is nearly always normal to the constant H value contours. Since the gradient move is nearly always normal, the gradient move and the exploratory move are practically indistinguishable at $H=5$.

The FIG. 7 sequence diagram is self-explanatory with the exception of the effects of constraint violations, which are discussed in the following section. The quantity $\Delta H_1$ is the response of the figure of merit to an exploratory move in feed, and the quantity $\Delta H_2$ is the response to an exploratory move in speed. $K_f$ and $K_V$ are manually set constants which control the size of the corresponding exploratory moves, and $K_3$ and $K_4$ are constants which control the scale factors of the gradient move. The quantities A and B indicate the sign of the exploratory moves.

FIG. 6 is a block diagram of the optimization computer. A programmer 300 receives synchronization signals from the numerical control system 26 and in turn directs the timing of a strategy logic unit 302 and a constraint violation logic unit 304.

The figure of merit is presented to the optimization computer as a train of pulses, $f_H$, on line 76, the frequency of which is proportional to H. Let $H_1$ be defined as the value of H just prior to an exploratory move. Measurement of $H_1$ consists of opening a sample gate 306 for a fixed period of time and accumulating the $H_1$ pulses into an up counter 308. During the exploratory move the $H_1$ value is transferred in parallel to a down counter 310. After the exploration has been completed, a new figure of merit value $H_2$ exists. The $H_2$ pulses are used to decrement the $H_1$ values stored in the down counter for the same fixed time period. The remainder in the down counter is thus $$\Delta H_1 = H_1 - H_2$$

At the same time as the $H_2$ pulses are decreasing the number stored in the down counter 310 they are accumulated in the up counter 308 for use in the computation of $\Delta H_2$. This process is repeated before and after each exploratory move.

The down counter 310 is so constructed that both $\Delta H$ and $-\Delta H$ (complemented form) are available as outputs. Also, information concerning the sign of $\Delta H$ is supplied to the strategy logic unit 302. The strategy logic unit will then select the appropriate output such that $|\Delta H|$ is always used. The gradient move scale factor constants $K_3$ and $K_4$ are integer powers of two. These scale factor constants are introduced as manual settings on a scale factor multiplier unit 312. Multiplying $\Delta H$ by these values consists of shifting the bits of $\Delta H$ one or more bit spaces to the right or left. The multiplied output is provided to a $\Delta$ storage loading control unit 314. This unit also receives manually inserted data from a unit 316 which indicates the magnitude of the exploratory moves $K_f$ and $K_V$.

Thus the $\Delta$ register loading control 314 has four channels of input information: $K_3|\Delta H_1|K_4|\Delta H_2|K_f$, and $K_V$. Upon command from the strategy logic unit 302, either the contents of the exploratory move unit 316 or the scale factor multiplier unit 312 are applied to the $\Delta f$ or $\Delta V$ registers 318 or 320 depending upon whether an exploratory or a gradient move is called for. The $K_f$ and $K_v$ values are entered into unit 316 by means of binary coded toggle switches. The numbers stored in the $\Delta f$ and $\Delta V$ registers may then represent either exploratory move values or gradient move values, depending upon the particular operation in progress. The $\Delta f$ register 318 provides output to the numerical control system interface on line 78 while the $\Delta_V$ register provides output on line 80.

A two bit sign register 322 is loaded by the strategy logic 302 at the same time as the $\Delta f$ and $\Delta V$ registers. These two bits, A and B, indicate the signs of the quantities in the $\Delta$ registers, and are taken from a storage section in the strategy logic 302. After the $\Delta f$ and $\Delta V$ registers have been loaded, the strategy logic will issue an "execute increment" command from unit 324. Separate commands are given for $f$ increments and for V increments. Both commands are given for the gradient move. The execute commands are transmitted to the numerical control system interface on line 326 and used to initiate the process of correcting the feed and speed values in accordance with the contents of the $\Delta f$ and $\Delta V$ registers.

At regular intervals the constraint violation logic unit 304 opens the constraint gate 328 and examines the outputs from the constraint violation detectors. Immediately upon detection of a violation the optimizing strategy is inhibited and the controller is shifted into a special correction subroutine. The correction commands given by the constraint violation logic are similar to the strategy commands. The constraint violation logic activates the $\Delta$ register loading control 314, loads the sign register 322 and gives "execute increment" commands on line 326 as required. The following correction rules are used:

| Violation: | Correction |
| --- | --- |
| $\theta_p$-max | Decrease V by $K_V$. |
| VIB-max | Decrease V by $K_V$. |
| V-max | Decrease V by $K_V$. |
| V-min | Increase V by $K_V$. |
| $f$-max | Decrease $f$ by $K_f$. |
| $f$-min | Increase $f$ by $K_f$. |
| T-max | Decrease $f$ by $K_f$. |

The correction is repeated until the violation signal is removed. In case of simultaneous occurrence of two violations, e.g., T-max and $f$-min, the logic is arranged so that the increasing correction dominates. Also, since $f$ and V corrections may be initiated simultaneously (as in a gradient move), there are no indeterminate or ambiguous conditions.

If the system were returned to the normal optimizing mode as soon as the constraint violation was removed, an unstable limit cycle may result. This would occur if the optimizing strategy immediately returned the system to the previous feed and speed values which resulted in the constraint violation. To preclude the occurrence of the limit cycle, a specially modified optimization logic is used immediately after removing a constraint violation. The special logic prohibits the immediate repetition of the moves which led to the violation condition.

Receipt of a "cutting not in progress" signal from the data reduction subsystem on line 72 will simulate a constraint violation and thereby inhibit the optimizing strategy. However, no corrective action will be taken. The feed and speed commands within the numerical control system will then hold their present value until the signal is removed, indicating that cutting has resumed. Indication of slewing or decelerating/accelerating conditions from the numerical control system on line 82 will have the same effect on the optimization computer.

NUMERICAL CONTROL SYSTEM INTERFACE

Figure 9:
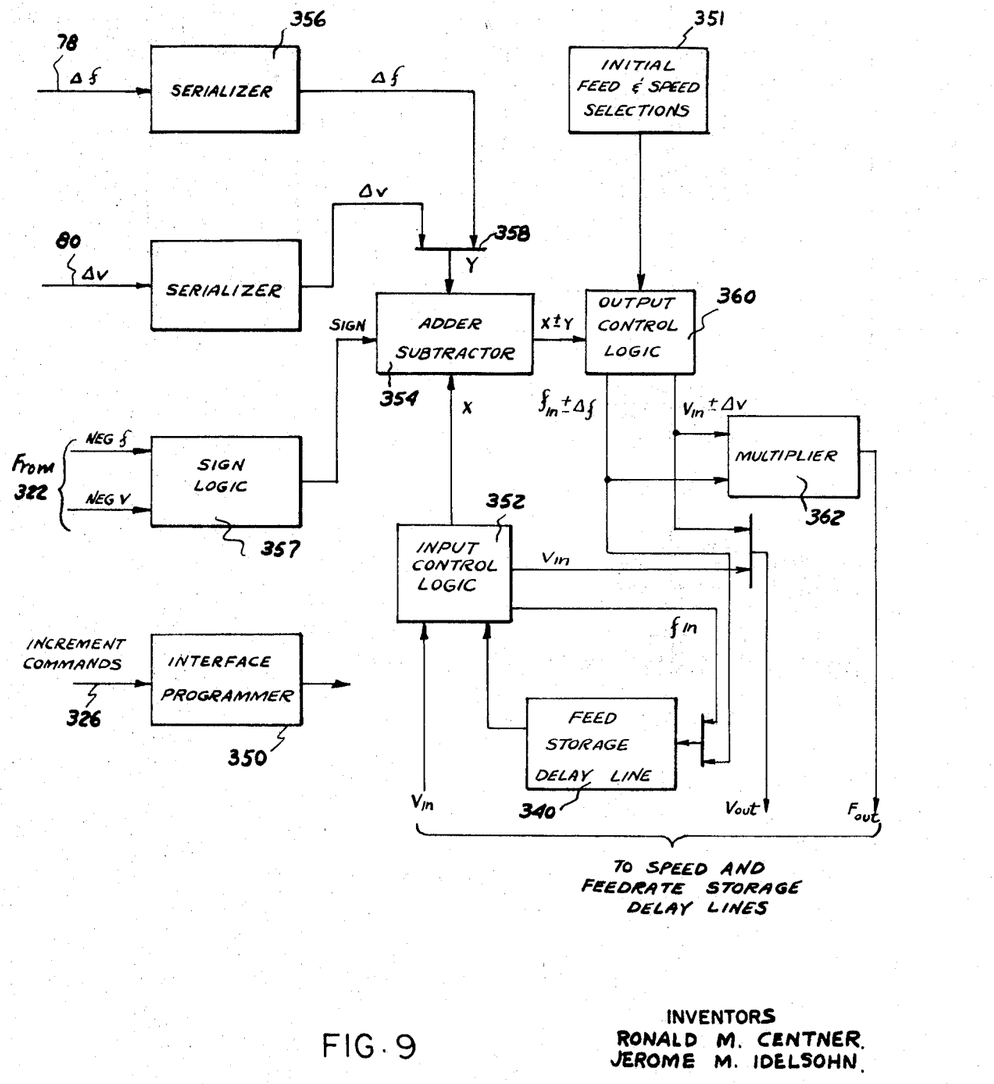
FIG. 9 is a block diagram of the interface between the numerical control system and the optimization computer.

The parameters to be adjusted by the adaptive controller are spindle speed and absolute feedrate. As shown in FIG. 9, the commands for these quantities are stored in the numerical control system 20 in serial binary form on magnetostrictive delay lines 340. The desired incremental change in spindle speed, $\Delta V$, is available directly from the adaptive controller and thus a serial add-subtract technique can be used to modify the stored spindle speed command. However, the absolute feedrate F is equal to the product of $f$ and V, and $\Delta F$ is not directly available. Therefore, a special computation is required. The numerical control system interface includes the circuitry required to implement this computation plus the timing and control circuitry necessary to synchronize the adaptive controller outputs with the numerical control system logic. FIG. 9 is a block diargam of the interface logic. When no increments are being supplied by the adaptive controller, the interface logic simply circulates the present values of V and $f$ through the input control logic.

When an execute increment command is received, the interface programmer 350 is started. The programmer supplies the timing and control signals necessary for the interface arithmetic. Operation is best illustrated for the gradient move, where both $f$ and V increments are present. Let $f_{in}$ and $V_{in}$ be the initial values of $f$ and V supplied by unit 351. The first step is the updating of $f_{in}$. The input control logic unit 352 closes the recirculate path to $f_{in}$ and applies $f_{in}$ to the X input of an adder-subtractor 354. At the same time $\Delta f$ is applied through the sign logic 357. The output of the adder-subtractor is $(f_{in} \pm \Delta f)$, which is sent by the output control 360 to the feed storage delay line 340 and to the multiplier 362. Similarly, $V_{in}$ is updated and $(V_{in} \pm \Delta V)$ is applied to the multiplier 362. The outputs of the interface are thus $$V_{out} = V_{in} \pm \Delta V$$

and $$F_{out} = (f_{in} \pm \Delta f)(V_{in} \pm \Delta V)$$

For the exploratory or constraint increments $\Delta f$ or $\Delta V$ may be zero but the operation of the interface logic is identical.

We claim:
1. A control system for a machine having a tool which is movable relative to a workpiece, to thereby interact with said workpiece to perform an operation thereon at a tool-workpiece interface, the interaction of said tool with said workpiece generating a measurable physical manifestation, comprising:
   a drive system operative in response to input signals to move said tool relative to said workpiece;
   means operative to measure the resulting physical manifestation and to generate a manifestation signal having a value which is a function of the manifestation;
   a source of constant signals related to a desired mode of operation of said machine;
   a first computer operative to receive the constant signals and the manifestation signal and operative to generate a train of pulses having a frequency which is a function of the received signals; and
   a second computer operative to receive the train of pulses and to generate input signals for said drive system having values which are a function of the rate of change of frequency of the train of pulses.

2. A control system for a machine having a tool adapted to be moved relative to a workpiece, to thereby interact with said workpiece to perform an operation thereon at a tool workpiece interface, the interaction of said tool with said workpiece generating measurable physical manifestations including tool-tip temperature, comprising:
   a drive system operative in response to input signals relative to said workpiece;
   means operative to measure at least the physical manifestation of tool-tip temperature, and to generate a manifestation signal having a value which is a function of the manifestation;
   a source of constant signals related to a desired mode of operation of said machine; and
   a computer operative to receive the constant signals and the manifestation signal and to generate input signals for said drive system having values which are a function of the received signals.

3. A control system for a machine having a tool which is movable to a workpiece, to thereby interact with said workpiece to perform an operation thereon at a tool-workpiece interface, the interaction of said tool with said workpiece generating a measurable physical manifestation, comprising:
   a drive system operative in response to input signals to move said tool relative to said workpiece;
   means operative to measure the resulting physical manifestation and to generate a manifestation signal having a value which is a function of the manifestation;
   a source of constant signals related to a desired mode of operation of said machine;
   a first computer operative to receive the constant signals and the manifestation signal and operative to generate a train of pulses having a frequency which is a function of the received signals;
   an optimization computer operative to receive the train of pulses and to generate modification signals having values which are a function of the rate of change of frequency of the train of pulses;
   a source of drive signals; and
   means operative to receive the drive signals and the modification signals and to modify the drive signals in accordance with the modification signals thereby generating input signals for said drive system.

4. A control system for a machine having a tool adapted to be moved relative to a workpiece, to thereby interact with said workpiece to perform an operation thereon at a tool-workpiece interface, the interaction of said tool with said workpiece generating measurable physical manifestations including tool-tip temperature comprising:
   a drive system operative in response to input signals to move said tool relative to said workpiece;
   means operative to measure at least the physical manifestation of a tool-tip temperature and to generate a manifestation signal having a value which is a function of the manifestation of tool-tip temperature;
   a source of constant signals related to a desired mode of operation of said machine;
   an optimization computer operative to receive the constant signals and the manifestation signal and to generate modification signals having values which are a function of the received signals;
   a source of drive signals; and
   means operative to receive the drive signals and the modification signals and to modify the drive signals in accordance with the modification signals to thereby generate input signals for said drive system.

5. The control system for a machine as defined in claim 3, wherein said source of drive signals comprises:
   a record containing numerical information including information relating to a desired path of said tool relative to said workpiece, and
   means operative to read said record and operable to generate drive signals in accordance with the numerical information relating to the desired tool path.

6. The control system for a machine as defined in claim 4, wherein said source of drive signals comprises:
   a record containing numerical information including information relating to a desired path of said tool relative to said workpiece, and
   means operative to read said record and operable to generate drive signals in accordance with the numerical information relating to the desired tool path.

7. The control system for a machine as defined in claim 4 wherein the modification signals are generated as a function of the rate of change of frequency of a train of pulses generated by said optimization computer, having a frequency which is a function of the constant and manifestation signals.

8. A control system for a machine having a tool which is movable relative to a workpiece to thereby interact with said workpiece to perform an operation thereon at a tool-workpiece interface, the interaction of said tool with said workpiece generating measurable physical manifestations including tool-tip temperature, comprising:
   a record containing numerical information including information relating to a desired path of said tool with respect to said workpiece;
   means operative to read said record and to generate drive signals in accordance with the numerical information relating to the desired tool path;
   a drive system operative to move said tool relative to said workpiece under control of the drive signals;
   means operative to measure at least the physical manifestation of tool-tip temperature and to generate a manifestation signal having a value which is a function of the manifestation measured;
   a source of constant signals having values setting desired ranges of machine operation;
   means operative to receive the constant signals and the manifestation signal, to generate a train of pulses having a frequency which is a function of the received signals, to generate modification signals having values which are a function of the rate of change of frequency of the train of pulses; and
   means operative to receive the drive signals and the modification signals and to modify the drive signals in accordance with the modification signals, thereby generating modified drive signals for said drive system.

References Cited

UNITED STATES PATENTS 3,327,101 6/1967 Evans __________ 235—151.11
3,220,315 11/1965 Mathias.

OTHER REFERENCES

Anderson et al., Institute of Radio Engineers Nat'l. Convention, vol. 6 Pt. 4, March 1958.

Roberts et al., Industrial and Engineering Chemistry, vol. 53, No. 11, November 1961.

EUGENE G. BOTZ, Primary Examiner

U.S. Cl. X.R.

77—5; 235—150.1; 318—18